(12) United States Patent
Tatara et al.

(10) Patent No.: US 6,704,627 B2
(45) Date of Patent: Mar. 9, 2004

(54) DRIVE FORCE DISTRIBUTION APPARATUS FOR HYBRID VEHICLE

(75) Inventors: Yusuke Tatara, Wako (JP); Hirokatsu Amanuma, Wako (JP); Kazuhiko Kitano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/166,700

(22) Filed: Jun. 12, 2002

(65) Prior Publication Data

US 2003/0037977 A1 Feb. 27, 2003

(30) Foreign Application Priority Data

Aug. 27, 2001 (JP) ..................... P2001-255738

(51) Int. Cl.[7] .............................................. G06F 17/00
(52) U.S. Cl. ...................................................... 701/22
(58) Field of Search .......................... 701/22; 180/65.2, 180/65.3, 65.4; 307/9.1

(56) References Cited

U.S. PATENT DOCUMENTS 5,176,213 A * 1/1993 Kawai et al. ................ 180/243

FOREIGN PATENT DOCUMENTS

JP          9-284911          10/1997
JP          11-59363          3/1999

* cited by examiner

*Primary Examiner*—Yonel Beaulieu
(74) *Attorney, Agent, or Firm*—Arent Fox Kintner Plotkin & Kahn, PLLC

(57) ABSTRACT

A drive force distribution apparatus for a hybrid vehicle having an engine for driving a pair of first drive wheels and an electric motor for driving a pair of second drive wheels. The drive force distribution apparatus includes a first clutch, a second clutch, and a battery. The apparatus further includes a first unit for deciding the distribution between a drive for driving the first drive wheels and a drive force for driving the second drive wheels, a second unit for deciding the distribution between a drive force for driving one of the second drive wheels and a drive force for driving the other of the second drive wheels according to a detected vehicle speed, steering angle, and yaw rate, and a clutch control unit for controlling a degree of engagement of each of the first and second clutches according to the distribution decided by the second unit.

4 Claims, 17 Drawing Sheets

MOT TEMPERATURE (°C)

※KLR : LATERAL DISTRIBUTION COEFFICIENT

DRIVE FORCE DISTRIBUTION APPARATUS FOR HYBRID VEHICLE

BACKGROUND OF THE INVENTION

1. Field of the Invention

The present invention relates to a drive force distribution apparatus for a hybrid vehicle having an engine for driving a pair of first drive wheels and an electric motor for driving a pair of second drive wheels.

2. Description of the Related Art

Conventionally, a control apparatus for this kind of hybrid vehicle is known from Japanese Patent Laid-open No. 2000-79833, for example. In this hybrid vehicle, front wheels are driven by an engine connected thereto, and rear wheels are driven by an electric motor connected thereto through a differential for the rear wheels. During deceleration of the hybrid vehicle, the electric motor functions as a generator for generating electric power, thereby recovering running energy as electrical energy and charging the electrical energy into a capacitor. During any running conditions other than the deceleration, the electric motor is driven as required by the electrical energy charged in the capacitor.

As general vehicle behavior stability control, it is known that a throttle opening is controlled so as to suppress the slip of drive wheels upon detection of the slip according to information from wheel speed sensors, an accelerator opening sensor, a throttle opening sensor, etc., thereby regulating an engine output. It is also known that a brake oil pressure applied to a wheel locked upon tire locking during braking is removed to thereby avoid the tire locking. Further, a vehicle behavior stability control system for preventing lateral slip of a vehicle during turning of the vehicle has been put to practical use, wherein a brake oil pressure applied to a specified wheel is increased and brake forces for wheels are individually controlled according to information such as a steering angle, lateral G, and yaw rate. Further, in a four-wheel drive vehicle, there has been proposed a drive system intended for stabilization of vehicle behavior by suitably distributing front and rear drive forces.

According to the hybrid vehicle described in the above-mentioned publication, the electric motor is connected through the differential to the rear wheels. Accordingly, the electric motor must always run together with the rotation of the rear wheels, and the running speed of the electric motor is higher than the rotational speed of the rear wheels because of the reduction ratio of the differential. It is therefore necessary for the electric motor to continuously run at high speeds during high-speed running of the vehicle, so that the durability against such high-speed continuous running is required. As a result, the electric motor is necessarily enlarged in size to ensure the durability, inviting an increase in manufacture cost. Further, since the right and left rear wheels are connected through the differential to the electric motor, the same torque is transmitted to the right and left rear wheels, and the vehicle behavior stability control is therefore insufficient during turning of the vehicle or upon slippage of the rear wheels.

Further, in a general vehicle capable of arbitrarily setting an engine output, only drive wheels (front wheels in an FF vehicle or rear wheels in an FR vehicle) can be controlled, and these right and left drive wheels are connected through a differential to the engine. Accordingly, a drive force of the engine cannot be suitably distributed to the right and left drive wheels. In vehicle lateral slip prevention control, a brake force is applied to a specified wheel to thereby stabilize the vehicle behavior, so that a part of the engine output is discarded as heat through a hydraulic brake.

SUMMARY OF THE INVENTION

It is therefore an object of the present invention to provide a drive force distribution apparatus for a hybrid vehicle which can arbitrarily control the distribution of a drive force to a pair of drive wheels connected to an electric motor according to a running condition of the vehicle.

In accordance with an aspect of the present invention, there is provided a drive force distribution apparatus having an engine for driving a pair of first drive wheels and an electric motor for driving a pair of second drive wheels. The drive force distribution apparatus includes a first clutch interposed between the electric motor and one of the second drive wheels; a second clutch interposed between the electric motor and the other of the second drive wheels; a battery for supplying electric energy to the electric motor and storing electric energy regenerated by the electric motor; a vehicle speed sensor for detecting a vehicle speed; an accelerator opening sensor for detecting an accelerator opening; a brake depression force sensor for detecting a brake depression force; a steering angle sensor for detecting a steering angle of a steering wheel; and a yaw rate sensor for detecting a yaw rate.

The drive force distribution apparatus further includes first means for deciding the distribution between a drive force for driving the first drive wheels and a drive force for driving the second drive wheels according to the vehicle speed detected, the accelerator opening detected, the brake depression force detected, a state of the battery, and a weight distribution of the vehicle; second means for deciding the distribution between a drive force for driving one of the second drive wheels and a drive force for driving the other of the second drive wheels according to the vehicle speed detected, the steering angle detected, and the yaw rate detected; and clutch control means for controlling a degree of engagement of each of the first and second clutches according to the distribution decided by the second means.

According to the present invention, the distribution between the drive force of the engine for driving the first drive wheels and the drive force of the electric motor for driving the second drive wheels can be properly made by the first means according to the detected vehicle speed, accelerator opening, brake depression force, battery state, and vehicle weight distribution. During deceleration of the vehicle, the running energy of the vehicle can be regenerated as electrical energy by the electric motor according to the brake depression force, battery state, etc., and the regenerated energy can be used for driving of the vehicle, thereby improving a fuel consumption. Further, the distribution between the drive force for driving one of the second drive wheels and the drive force for driving the other second drive wheel is decided by the second means according to the detected vehicle speed, steering angle, and yaw rate. Then, the degree of engagement of each of the first and second clutches is controlled by the clutch control means according to the distribution decided by the second means, and the drive force of the electric motor is distributed to the second drive wheels (the right and left drive wheels), thereby allowing the stabilization of vehicle behavior such as prevention of lateral slip during turning of the vehicle.

The second means includes means for deciding a calculated lateral G from the vehicle speed and the steering angle; means for deciding a lateral distribution coefficient KLR from the calculated lateral G and the vehicle speed; means for calculating a steering angle yaw rate and a lateral G yaw rate; means for calculating a corrected torque value KTQ according to the steering angle yaw rate calculated and the lateral G yaw rate calculated; and means for calculating the drive forces for driving the second drive wheels according to the lateral distribution coefficient KLR and the corrected torque value KTQ. Preferably, when the sign of the drive force calculated on one of the second drive wheels is different from the sign of the drive force calculated on the other second drive wheel, either of the drive forces is set to 0. More preferably, the drive force distribution apparatus further includes a G sensor for detecting a lateral G, and the second means decides the distribution between the drive forces for driving the second drive wheels according to the vehicle speed detected, the steering angle detected, the yaw rate detected, and the lateral G detected.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
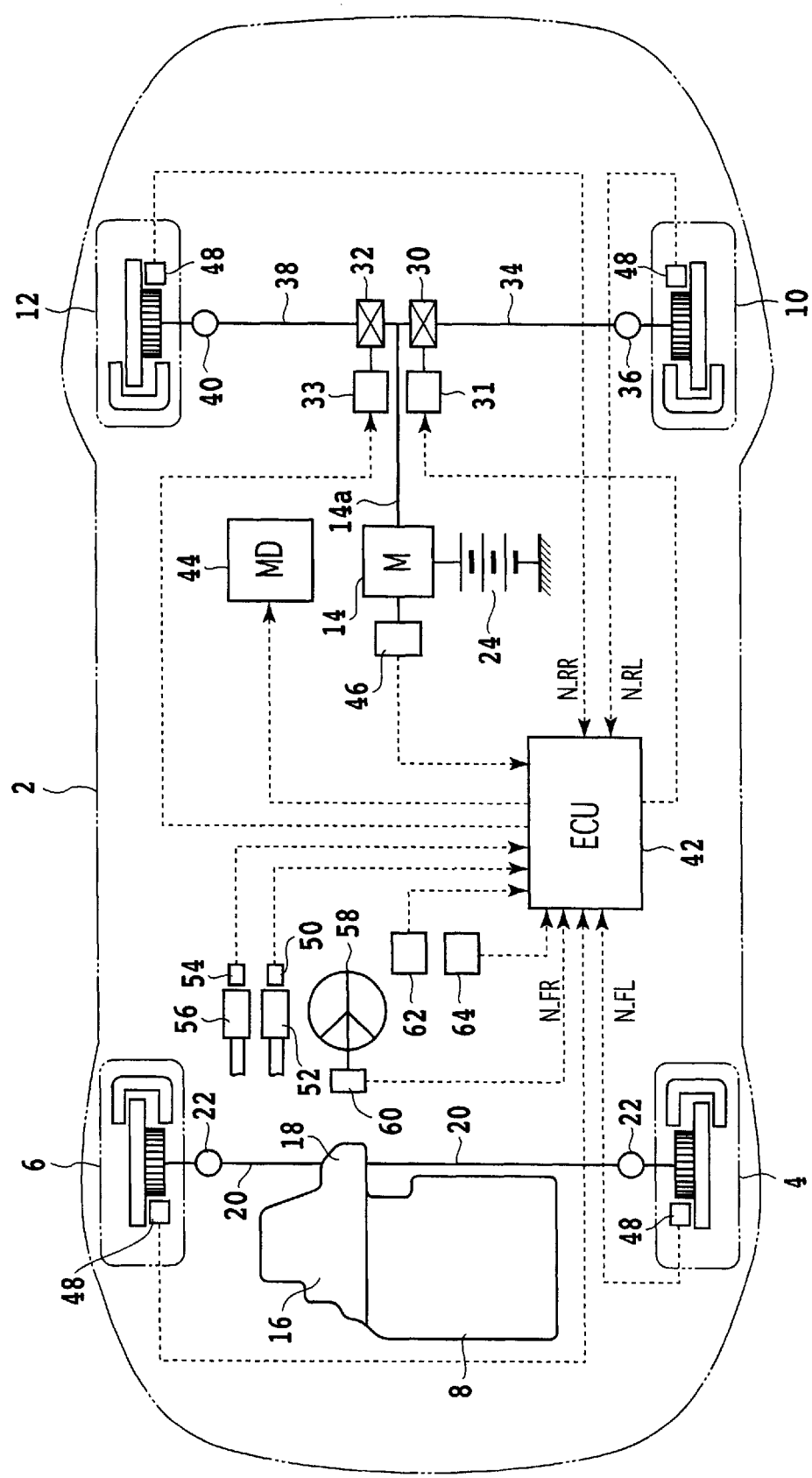
FIG. 1 is a schematic plan view showing the configuration of a hybrid vehicle on which the drive force distribution apparatus of the present invention is mounted.

A drive force distribution apparatus according to a preferred embodiment of the present invention will now be described in detail with reference to the drawings. FIG. 1 shows a schematic configuration of a hybrid vehicle 2 to which the drive force distribution apparatus according to the present invention is applied. As shown in FIG. 1, left and right front wheels 4 and 6 are driven by an engine 8, and left and right rear wheels 10 and 12 are driven by an electric motor 14 in this vehicle 2. The engine 8 is laterally mounted on the vehicle 2 at its front portion, and is connected through an automatic transmission 16 having a torque converter (not shown), a front differential 18 having a reduction gear (not shown), left and right front axles 20, and left and right constant-velocity joints 22 to the left and right front wheels 4 and 6.

The motor 14 is configured by a servo motor, and it is connected to a battery 24 as a drive source for the motor 14, whereby the motor 14 is driven by the battery 24. The motor 14 is further connected through left and right clutches 30 and 32, left and right rear axles 34 and 38, and left and right constant-velocity joints 36 and 40 to the left and right rear wheels 10 and 12. The left and right clutches 30 and 32 are interposed between an output shaft 14a of the motor 14 and the left and right rear axles 34 and 38. When the motor 14 is driven by the battery 24 and each of the clutches 30 and 32 is engaged, the rear wheels 10 and 12 are driven and the vehicle 2 becomes a four-wheel driven condition. The motor 14 can be continuously operated at any rotational speeds not greater than a predetermined maximum allowable rotational speed, and the output from the motor 14 can be arbitrarily changed within a range not exceeding a maximum output (e.g., 12 kW).

The motor 14 has a function as a generator for performing power generation (i.e., regeneration) when being rotationally driven by running energy of the vehicle 2, and electrical energy generated from the motor 14 is charged into the battery 24. A state of charge (SOC) of the battery 24 is calculated according to detected current and voltage values of the battery 24 by an electronic control unit (ECU) 42 to be hereinafter described. The motor 14 is connected through a motor driver 44 to the ECU 42. In performing the power generation by the motor 14, the rotational speed of the motor 14 is controlled by the ECU 42 as will be hereinafter described. The motor 14 is provided with a motor rotational angle position sensor 46 configured by a resolver. The motor rotational angle position sensor (motor rotational speed detecting means) 46 outputs to the ECU 42 a detection signal corresponding to a rotational angle position of the motor 14. The ECU 42 then calculates a rotational speed of the motor 14 according to this detection signal.

Each of the clutches 30 and 32 is configured by a wet type multiple-disc clutch formed by alternately arranging multiple clutch discs and multiple clutch plates in a comblike fashion, for example. Alternatively, each of the clutches 30 and 32 may be configured by the combination of a wet type multiple-disc clutch and an electromagnetic clutch instead of the wet type multiple-disc clutch only. The clutches 30 and 32 are connected to actuators 31 and 33, respectively. Each of the actuators 31 and 33 is configured by a linear solenoid valve connected to the ECU 42 and a coil spring (both not shown), for example. The linear solenoid valve is connected to an oil pressure source (not shown).

Each of the actuators 31 and 33 is operated in such a manner that when the linear solenoid valve is driven by a drive signal from the ECU 42, the clutch discs are pressed on the respective clutch plates by an oil pressure supplied from the oil pressure source against a biasing force of the coil spring, thereby engaging each of the clutches 30 and 32. An engaging force of each of the clutches 30 and 32 is controlled by controlling a drive current for the linear solenoid valve or by controlling a duty ratio of the drive signal from the ECU 42, so that the clutch engaging force can be continuously changed. Conversely, when the linear solenoid valve is not driven, the supply of the oil pressure from the oil pressure source is stopped, so that the clutch discs and the clutch plates are separated from each other by the biasing force of the coil spring, thereby disengaging each of the clutches 30 and 32.

Each of the left and right front wheels 4 and 6 and the left and right rear wheels 10 and 12 is provided with a magnetic pickup type wheel rotational speed sensor 48, and detection signals indicative of left and right front wheel rotational speeds N_FL and N_FR and left and right rear wheel rotational speeds N_RL and N_RR are output from the respective wheel rotational speed sensors 48 to the ECU 42. The ECU 42 calculates a vehicle speed Vcar according to these detection signals. The ECU 42 further inputs a detection signal indicative of an opening degree of an accelerator pedal 52 (including an on/off position thereof) from an accelerator opening sensor 50, a detection signal indicative of a depression force applied to a brake pedal 56 from a brake depression force sensor 54, and a detection signal indicative of a steering angle of a steering wheel 58 from a steering angle sensor 60. The ECU 42 further inputs detection signals from a yaw rate sensor 62 and a G sensor 64. The ECU 42 is configured by a microcomputer including a RAM, ROM, CPU, and I/O interface. The ECU 42 drives the actuators 31 and 33 to engage/disengage the clutches 30 and 32 and to also control the clutch engaging force thereof according to the detection signals from the various sensors 48, 50, 54, 60, 62, and 64.

Figure 2:
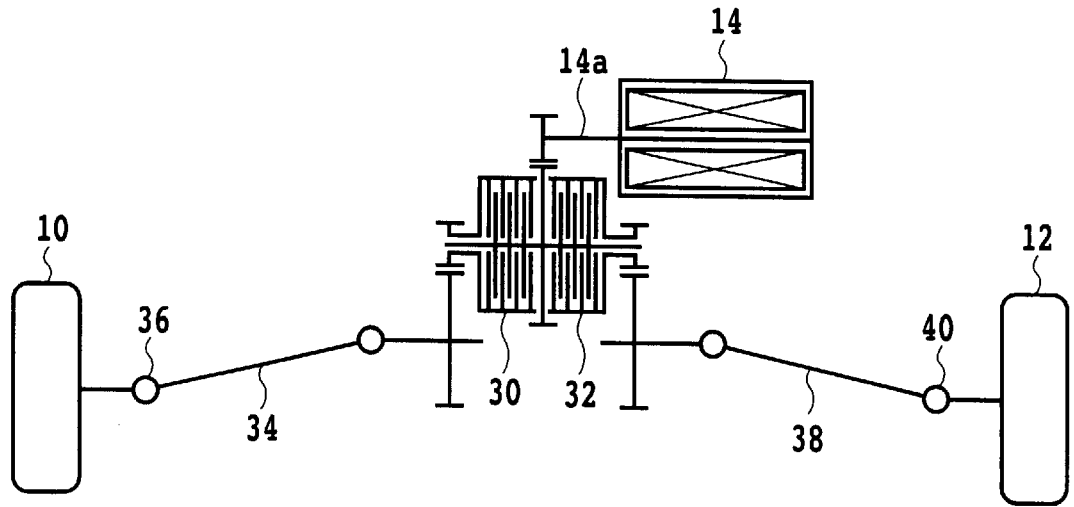
FIG. 2 is a schematic plan view showing the configuration of a drive force distribution mechanism according to a first preferred embodiment of the present invention.

Referring next to FIG. 2, there is shown a schematic view of a drive force distribution mechanism according to a first preferred embodiment for distributing the torque of the motor 14 to the left and right rear wheels 10 and 12. The wet type multiple-disc clutch 30 and a reduction rear are interposed between the output shaft 14a of the motor 14 and the left rear axle 34, and the wet type multiple-disc clutch 32 and a reduction rear are interposed between the output shaft 14a and the right rear axle 38. By controlling the engaging forces of the clutches 30 and 32 with the respective actuators 31 and 33 (see FIG. 1), the torque of the motor 14 is distributed to the rear wheels 10 and 12.

Figure 3:
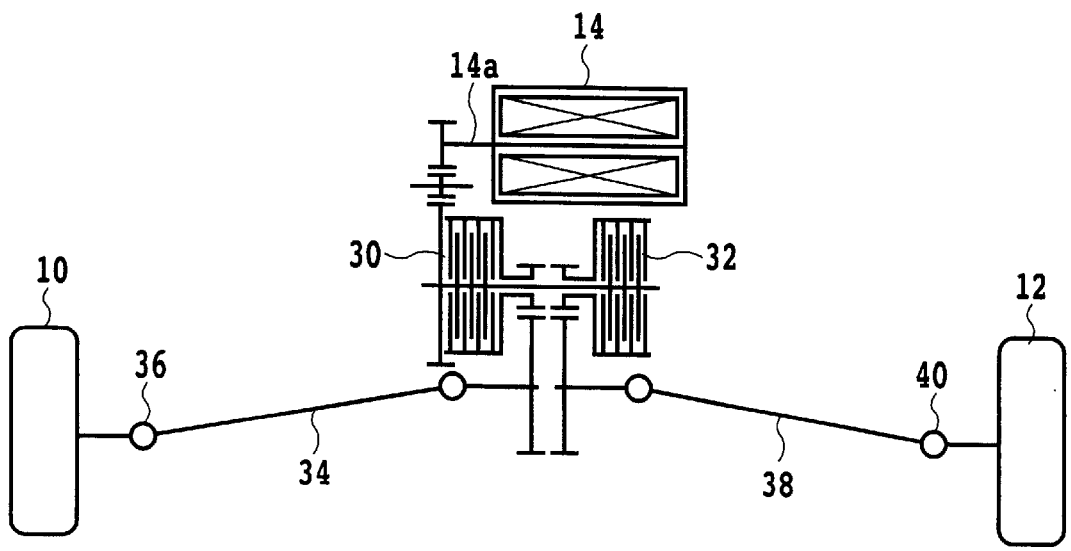
FIG. 3 is a view similar to FIG. 2, showing a modification.
Figure 4:
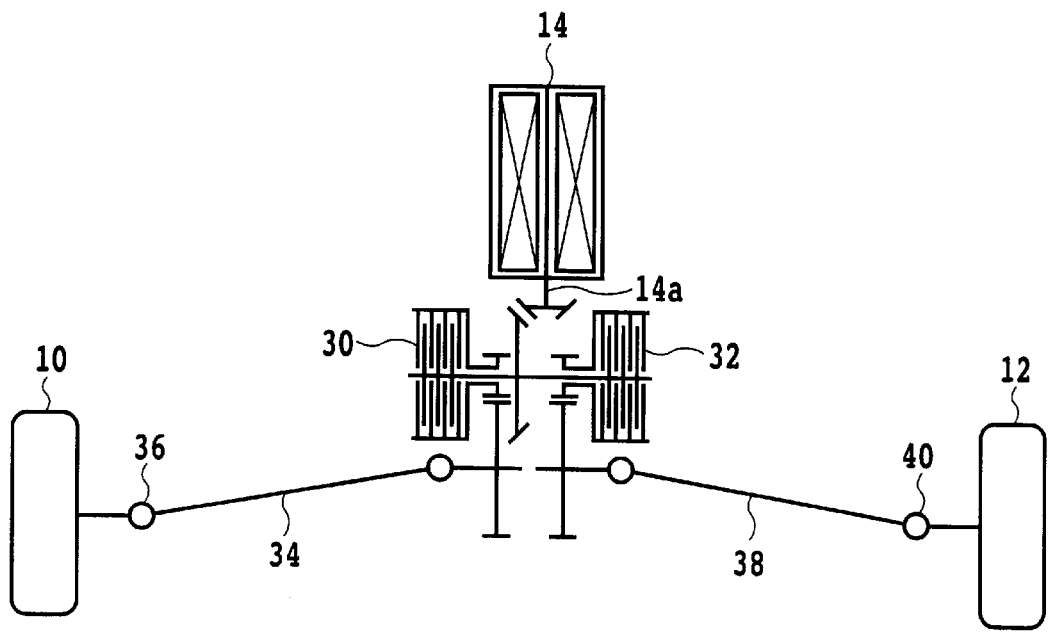
FIG. 4 is a view similar to FIG. 2, showing another modification.
Figure 5:
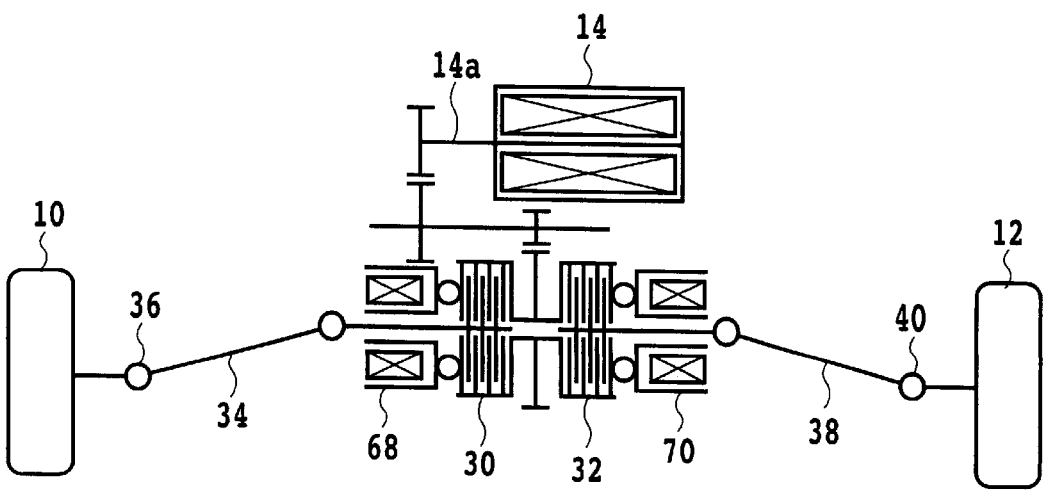
FIG. 5 is a schematic plan view showing the configuration of a drive force distribution mechanism according to a second preferred embodiment of the present invention.
Figure 6:
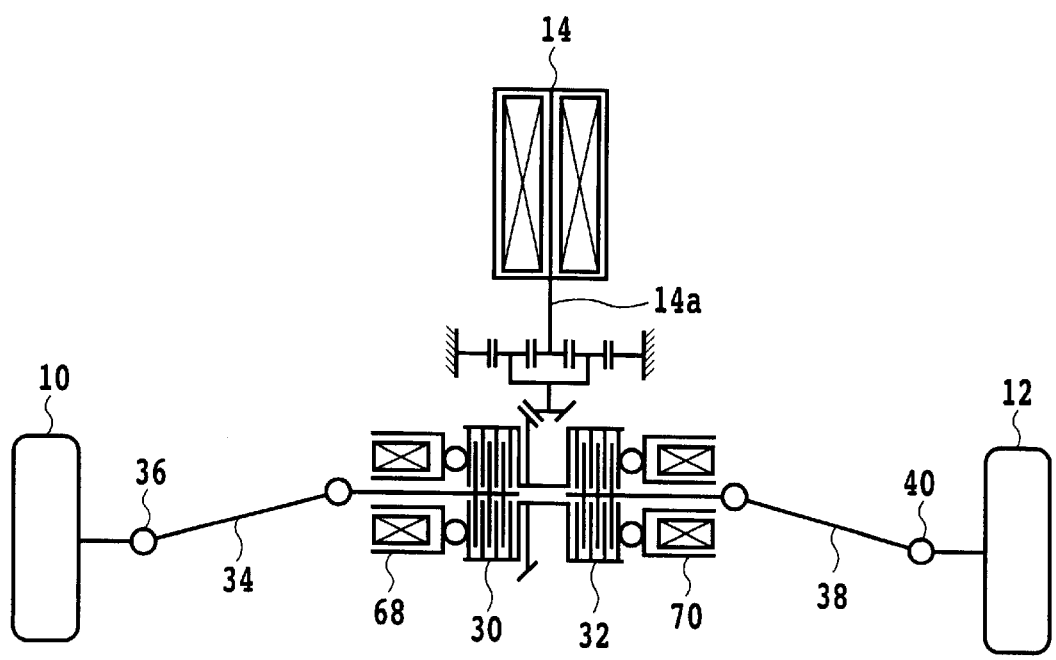
FIG. 6 is a view similar to FIG. 5, showing a modification.

FIGS. 3 and 4 show modifications of the first preferred embodiment shown in FIG. 2. These modifications are different from the first preferred embodiment shown in FIG. 2 in the arrangement of the motor 14, the clutches 30 and 32, and the reduction gears. FIG. 5 shows a second preferred embodiment of the mechanism for distributing the torque of the motor 14. In this preferred embodiment, electromagnetic clutches 68 and 70 are arranged adjacent to the clutches 30 and 32, respectively. The engaging forces of the clutches 30 and 32 are controlled by the electromagnetic clutches 68 and 70, respectively. FIG. 6 shows a modification of the second preferred embodiment shown in FIG. 5. This modification is different from the second preferred embodiment shown in FIG. 5 in the arrangement of the motor 14 and the reduction gears.

Figure 7:
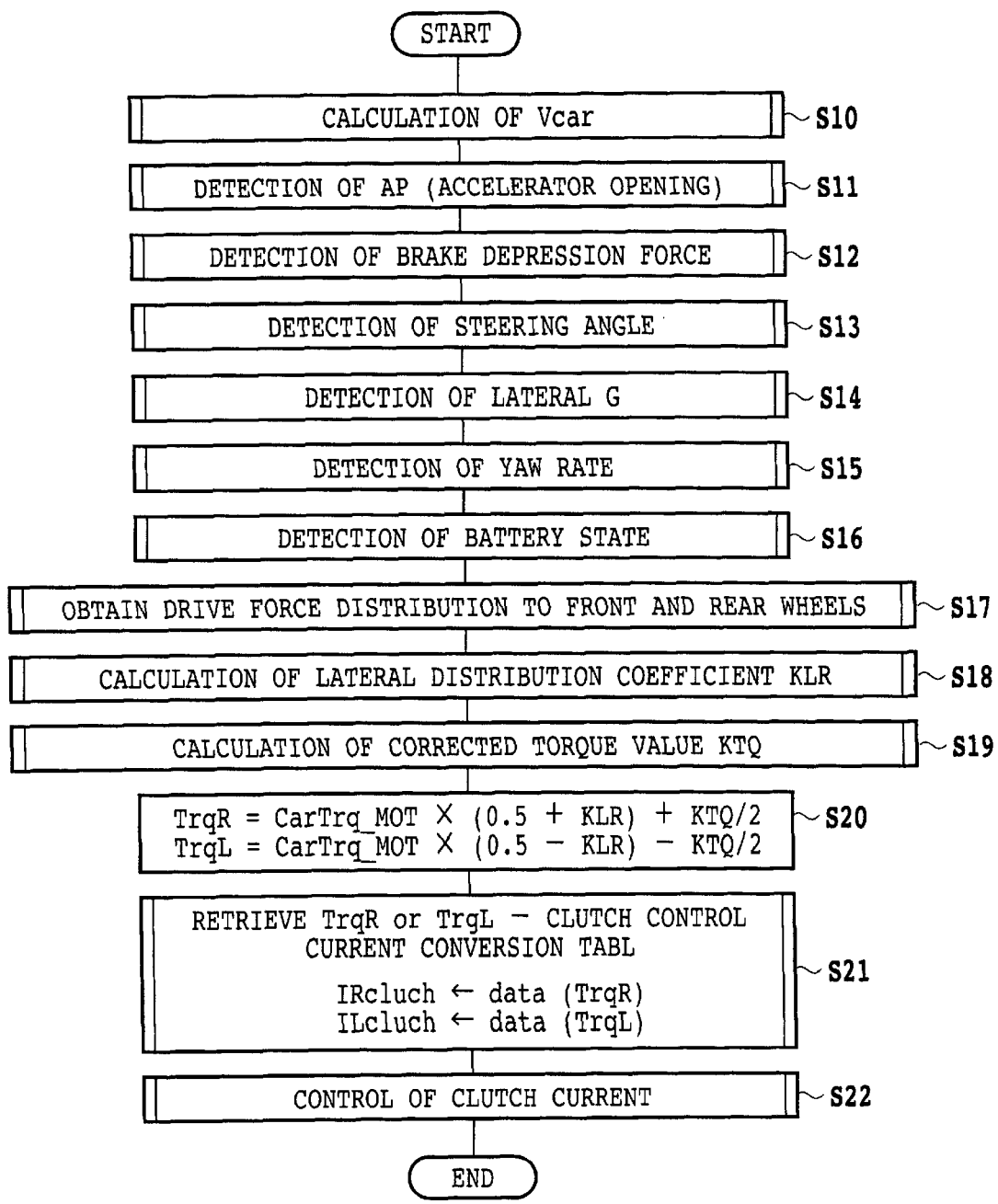
FIG. 7 is a flowchart showing a main routine for vehicle behavior stabilization control according to the present invention.

There will now be described control processing for the drive force distribution apparatus of the present invention with reference to the flowcharts shown in FIGS. 7, 8, 9, 17, and 25. This processing is executed at predetermined time periods (e.g., 10 msec). FIG. 7 shows a main routine of this processing. In step S10, a vehicle speed Vcar is calculated according to detection signals from the wheel rotational speed sensors 48. Thereafter, an opening degree of the accelerator pedal 52 is detected by the accelerator opening sensor 50 (step S11), a depression force applied to the brake pedal 56 is detected by the brake depression force sensor 54 (step S12), and a steering angle of the steering wheel 58 is detected by the steering angle sensor 60 (step S13). Further, a lateral G is detected by the G sensor 64 (step S14), and a yaw rate is detected by the yaw rate sensor 62 (step S15). Detection signals from these sensors are input into the ECU 42.

Figure 8:
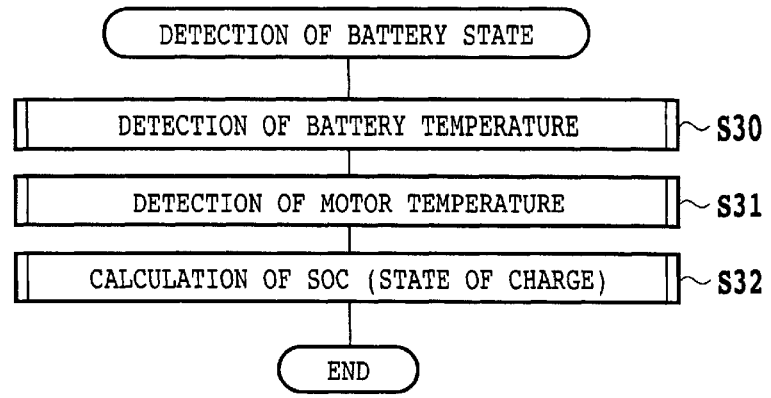
FIG. 8 is a flowchart showing a subroutine for battery state detection.
Figure 9:
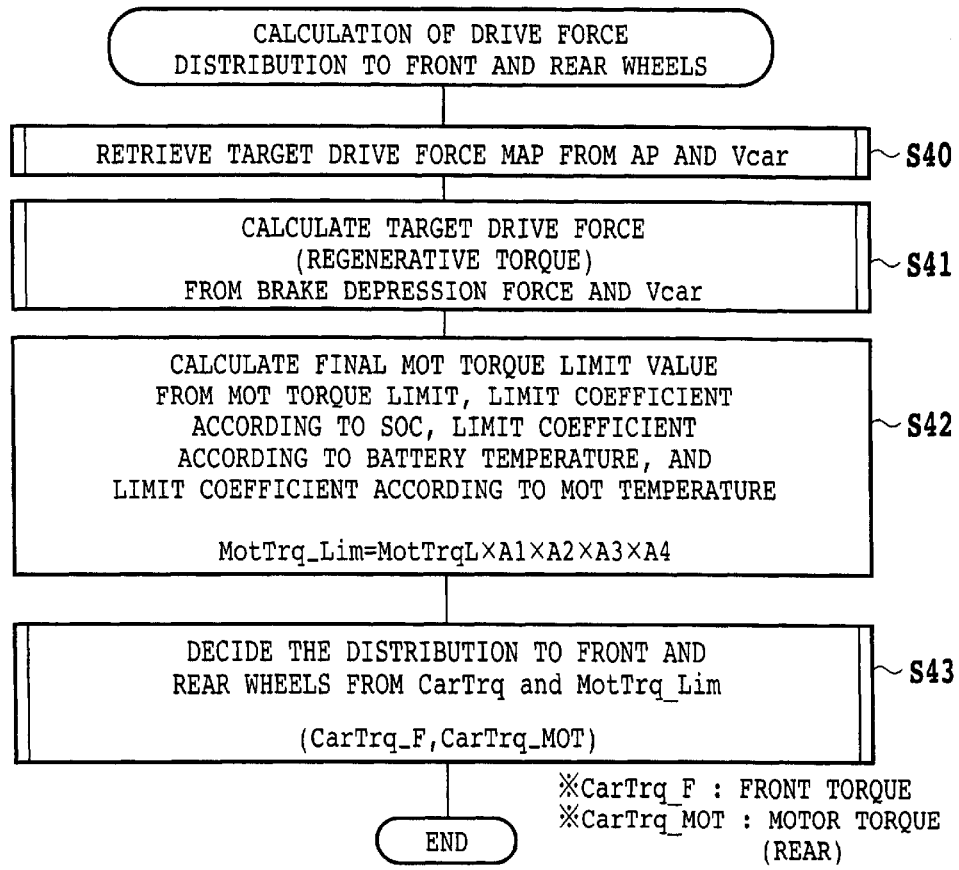
FIG. 9 is a flowchart showing a subroutine for calculation of the distribution of drive forces to front and rear wheels.

Thereafter, the program proceeds to step S16 to detect the state of the battery 24. The state of the battery 24 is detected in accordance with the subroutine shown in FIG. 8. Referring to FIG. 8, the temperature of the battery 24 is first detected in step S30, and the temperature of the motor 14 is next detected in step S31. The motor temperature detection step S31 is such that when the temperature of the motor 14 is lower than or equal to a predetermined temperature (e.g., 140° C.), the control shown in FIG. 7 is executed, whereas when the temperature of the motor 14 is higher than the predetermined temperature, the driving of the motor 14 by the battery 24 is stopped.

Thereafter, the program proceeds to step S32 to calculate the state of charge (SOC) of the battery 24. The SOC calculation step S32 is such that a charge quantity and a discharge quantity are integrated in the ECU 42 according to a current value to calculate the SOC according to the result of this integration. A calculated value for the SOC is corrected according to a terminal voltage or terminal current. The steps S10 to S16 in the main routine constitute a vehicle state detection step, and the detection signals are input into the ECU 42 and used for the following control.

Figure 10:
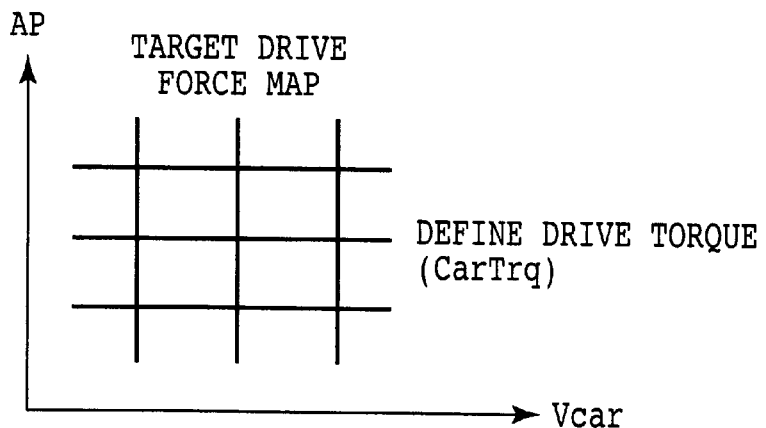
FIG. 10 is a graph showing a target drive force map.
Figure 11:
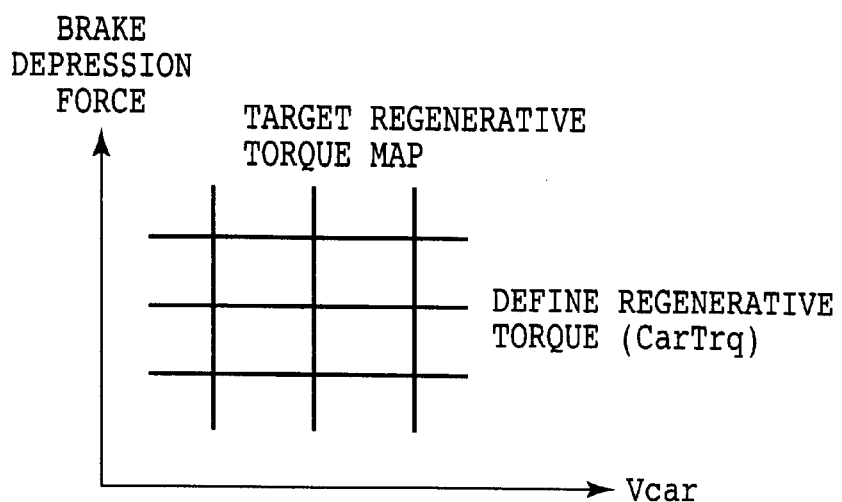
FIG. 11 is a graph showing a target regenerative torque map.

Referring again to FIG. 7, the battery state detection step S16 is followed by step S17 to calculate the drive force distribution between the front and rear wheels. This drive force distribution calculation step S17 will now be described in detail with reference to the subroutine shown in FIG. 9. In step S40, a target drive force map shown in FIG. 10 is retrieved according to the accelerator pedal opening (AP) and the vehicle speed Vcar to calculate a target drive torque CarTrq. In step S41, a target regenerative torque map shown in FIG. 11 is retrieved according to the brake depression force and the vehicle speed Vcar to calculate a target regenerative torque CarTrq.

Figure 12:
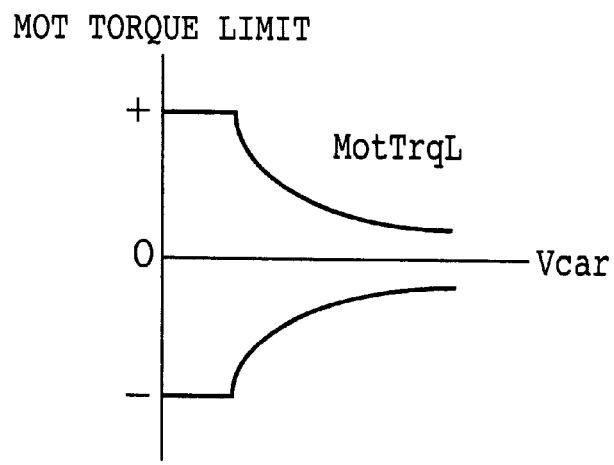
FIG. 12 is a table showing a motor torque limit according to a vehicle speed Vcar.
Figure 13:
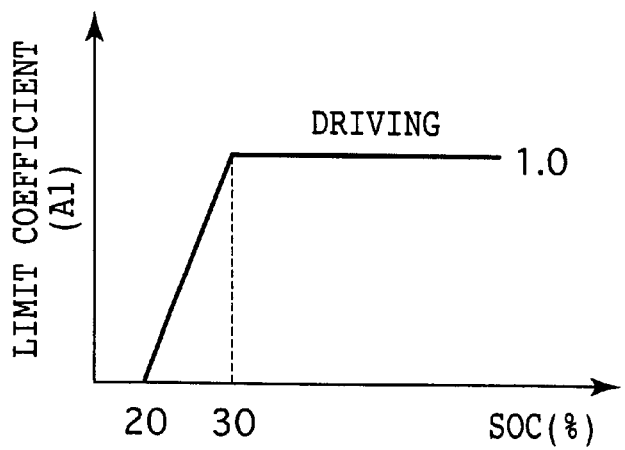
FIG. 13 is a table showing a limit coefficient A1 in the case of driving according to the SOC of the battery.

In step S42, a final motor torque limit value MotTrq_Lim is calculated from a motor torque limit MotTrqL, limit coefficients A1 and A2 according to SOC, limit coefficient A3 according to battery temperature, and limit coefficient A4 according to motor temperature. The motor torque limit MotTrqL decreases with an increase in the vehicle speed Vcar as shown in FIG. 12. In the case of a negative sign in FIG. 12, a regenerative torque is indicated. As shown in FIG. 13, the limit coefficient A1 according to SOC in the case of a drive torque is set to 1.0 when the SOC is 30% or more, and the limit coefficient A1 is set to 0 when the SOC is 20% or less, so that the driving of the motor 14 by the battery 24 is not performed.

Figure 14:
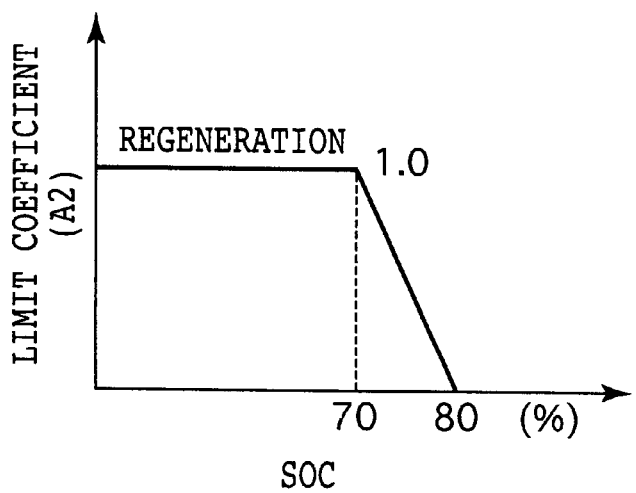
FIG. 14 is a table showing a limit coefficient A2 in the case of regeneration according to the SOC of the battery.
Figure 15:
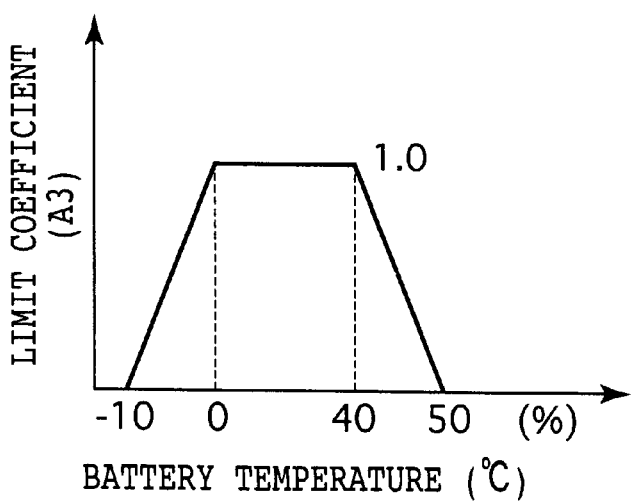
FIG. 15 is a table showing a limit coefficient A3 according to the temperature of the battery.

In the case of a regenerative torque, the limit coefficient A2 according to SOC is set to 1.0 when the SOC is 70% or less, and the limit coefficient A2 is set to 0 when the SOC is 80% or more to suspend the regeneration by the motor 14 as shown in FIG. 14. As shown in FIG. 15, the limit coefficient A3 according to battery temperature is set to 1.0 when the battery temperature is in the range of 0° C. to 40° C., and the limit coefficient A3 is set to 0 when the battery temperature is −10° C. or less and 50° C. or more to suspend the driving of the motor 14 by the battery 24 and the regenerative braking by the motor 14.

Figure 16:
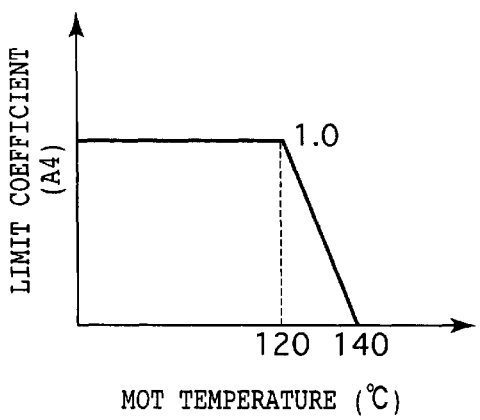
FIG. 16 is a table showing a limit coefficient A4 according to the temperature of the motor.

As shown in FIG. 16, the limit coefficient A4 according to motor temperature is set to 1.0 when the motor temperature is 120° C. or less, and the limit coefficient A4 is set to 0 when the motor temperature is 140° C. or more to suspend the driving of the motor 14. These motor temperatures are set according to the characteristic or performance of the motor 14. When any one of the above limit coefficients A1, A2, A3, and A4 is 0, the final motor torque limit value MotTrq_Lim becomes 0 to stop the driving of the motor 14. In this case, the vehicle 2 becomes an FF vehicle driven by the drive force of the engine 8 only.

In step S43, the distribution of the drive force between the front and rear wheels is decided according to the target drive force CarTrq, the final motor torque limit value MotTrq_Lim, and the distribution of the vehicle weight. That is, the distribution between the front torque CarTrq_F and the motor torque (rear torque) CarTrq_MOT is decided. In other words, the drive torque of the motor 14 is first decided and the remaining required drive force is controlled to be provided by the engine 8.

Figure 17:
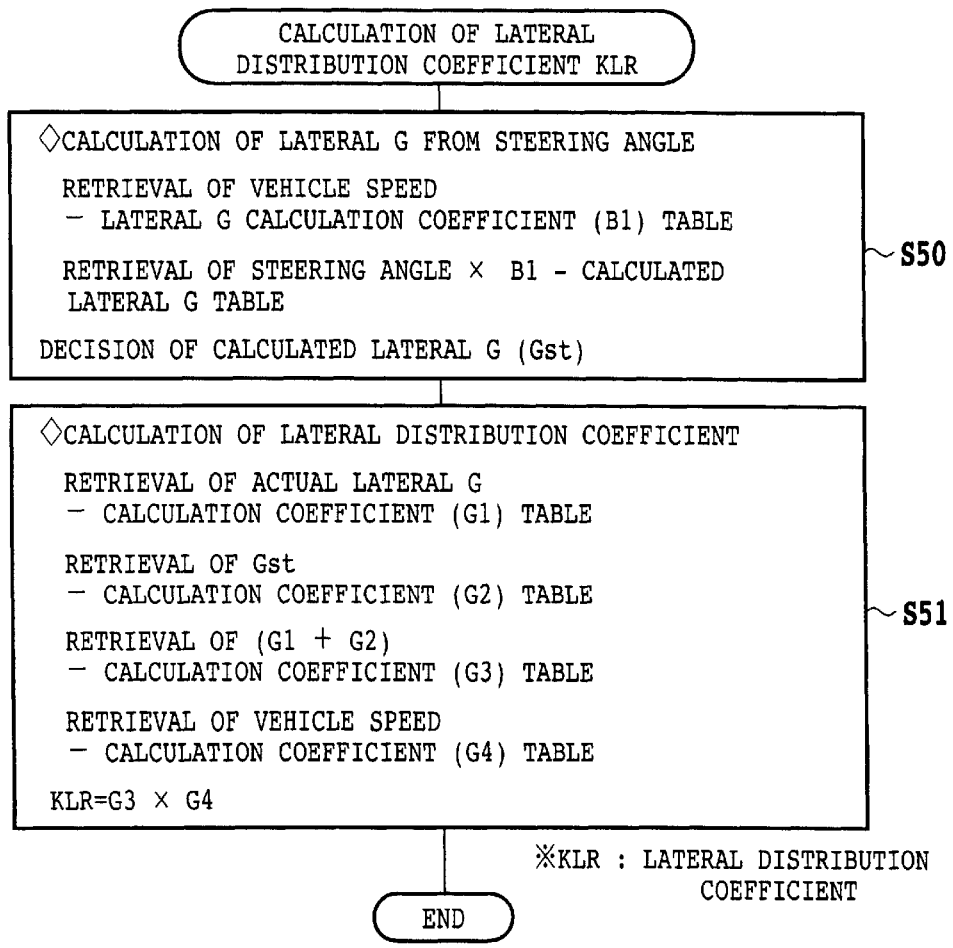
FIG. 17 is a flowchart showing a subroutine for calculation of a lateral distribution coefficient KLR.
Figure 18:
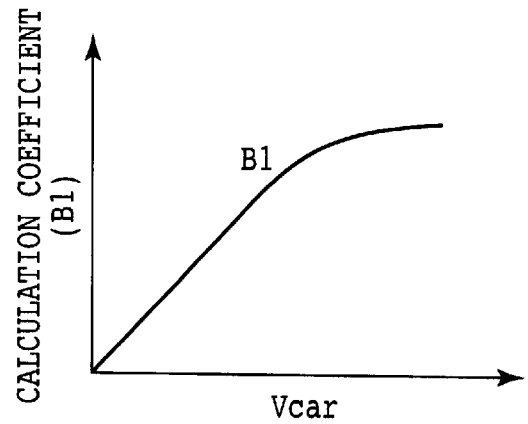
FIG. 18 is a table showing a calculation coefficient B1 according to a vehicle speed Vcar.
Figure 19:
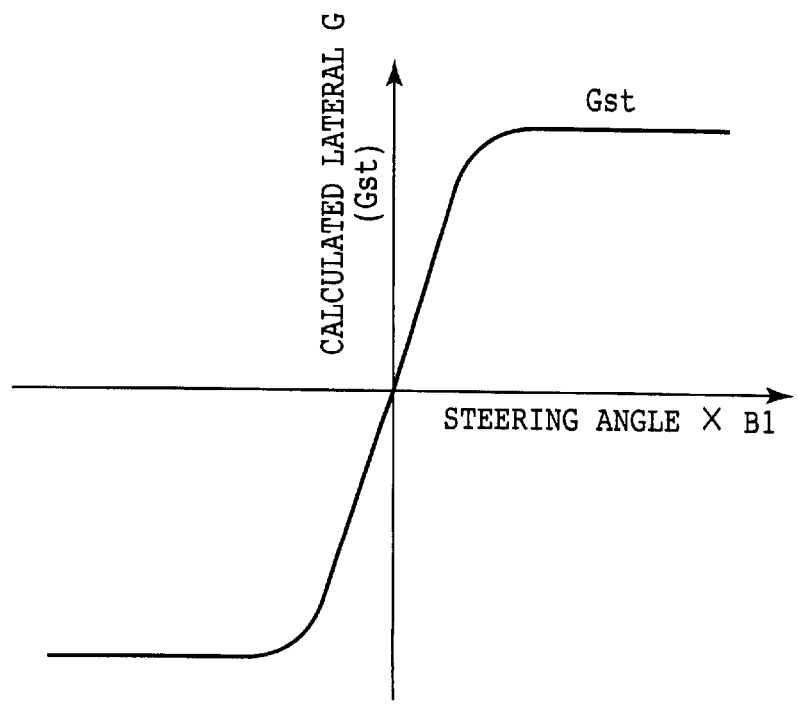
FIG. 19 is a table showing a calculated lateral G (Gst) according to (steering angle)×B1.
Figure 20:
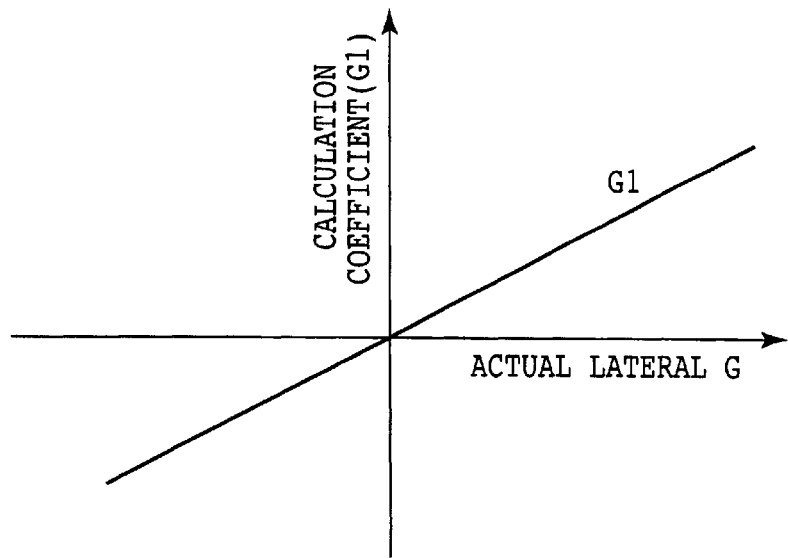
FIG. 20 is a table showing a calculation coefficient G1 according to an actual lateral G.
Figure 21:
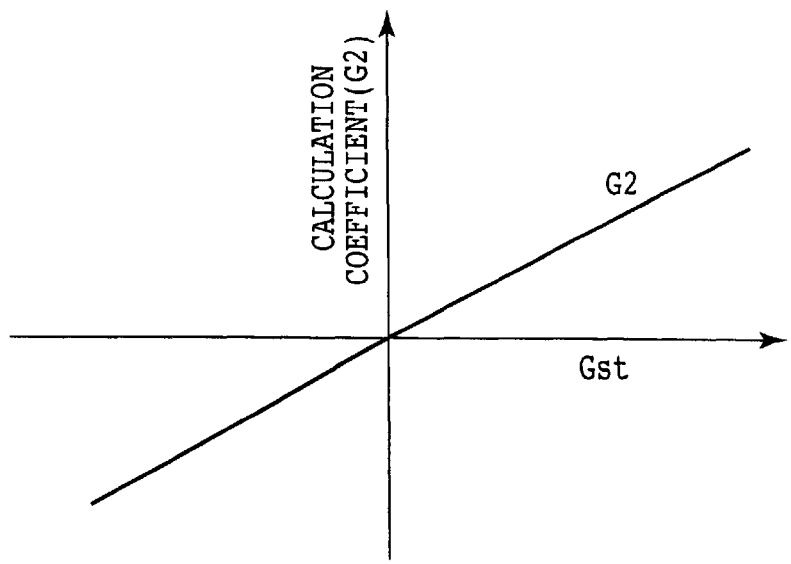
FIG. 21 is a table showing a calculation coefficient G2 according to Gst.

Referring again to FIG. 7, a lateral distribution coefficient KLR is calculated in step S18 after the calculation of the drive force distribution between the front and rear wheels in step S17. A calculation method for the lateral distribution coefficient KLR is shown in the subroutine of FIG. 17. In step S50 shown in FIG. 17, the table shown in FIG. 18 defining the relation between a vehicle speed Vcar and a lateral G calculation coefficient B1 is first retrieved to calculate the lateral G calculation coefficient B1. Thereafter, the table shown in FIG. 19 defining the relation between a steering angle×B1 and a calculated lateral G (Gst) is retrieved to decide the calculated lateral G (Gst). Then, the program proceeds to step S51 to retrieve the table shown in FIG. 20 defining the relation between an actual lateral G and a calculation coefficient G1 and thereby calculate the calculation coefficient G1. Further, the table shown in FIG. 21 defining the relation between Gst and a calculation coefficient G2 is retrieved to calculate the calculation coefficient G2.

Figure 22:
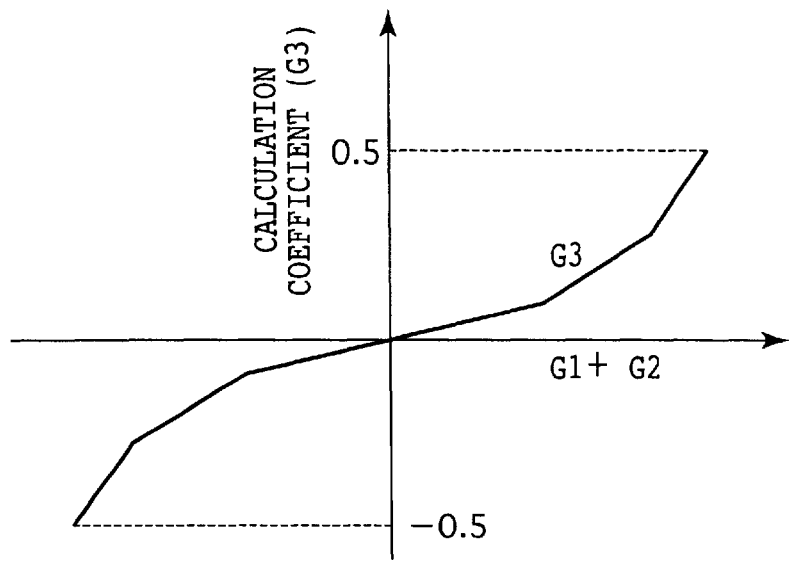
FIG. 22 is a table showing a calculation coefficient G3 according to G1+G2.
Figure 23:
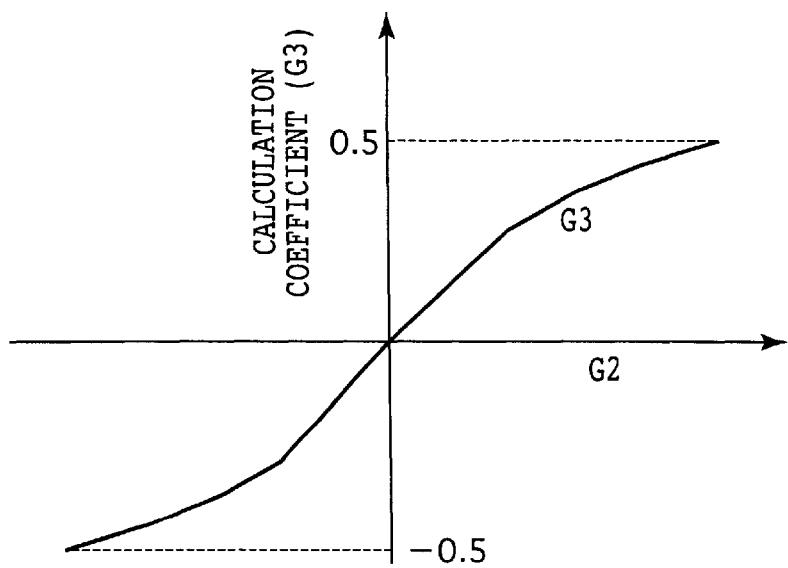
FIG. 23 is a table showing a calculation coefficient G3 according to G2 in the case that a G sensor is not used.
Figure 24:
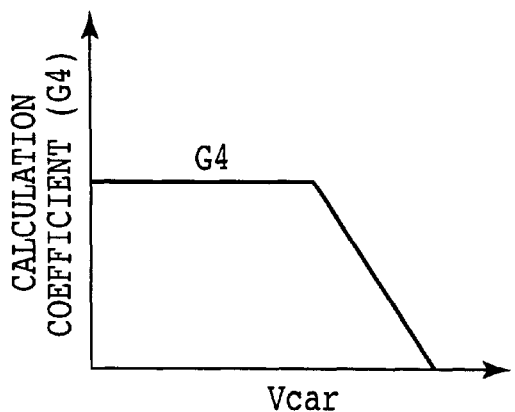
FIG. 24 is a table showing a calculation coefficient G4 according to a vehicle speed Vcar.

Thereafter, the table shown in FIG. 22 defining the relation between G1+G2 and a calculation coefficient G3 is retrieved to calculate the calculation coefficient G3. In FIG. 22, the reason for $-0.5 \leq G3 \leq 0.5$ is that the relation of $-0.5 \leq KLR \leq 0.5$ holds. In the case that the G sensor 64 is not used, the calculation coefficient G1 shown in FIG. 20 becomes 0. Accordingly, the table shown in FIG. 23 defining the relation between G2 and G3 is retrieved to calculate G3. Thereafter, the table shown in FIG. 24 defining the relation between a vehicle speed Vcar and a calculation coefficient G4 is retrieved to obtain the calculation coefficient G4 and finally obtain the lateral distribution coefficient KLR from G3×G4.

The coefficient G4 takes values ranging from 0 to 1.0 for limit processing to the lateral distribution coefficient KLR. For example, G4 takes a maximum value of 0.7. In this case, the lateral distribution coefficient KLR becomes 0.5×0.7= 0.35 at the maximum. When the vehicle speed Vcar is high during high-speed running of the vehicle, the lateral distribution coefficient KLR is less than 0.35, and the vehicle behavior stability control of the present invention is not applied. This is due to the fact that the vehicle becomes more stable during high-speed running by the above setting.

Figure 25:
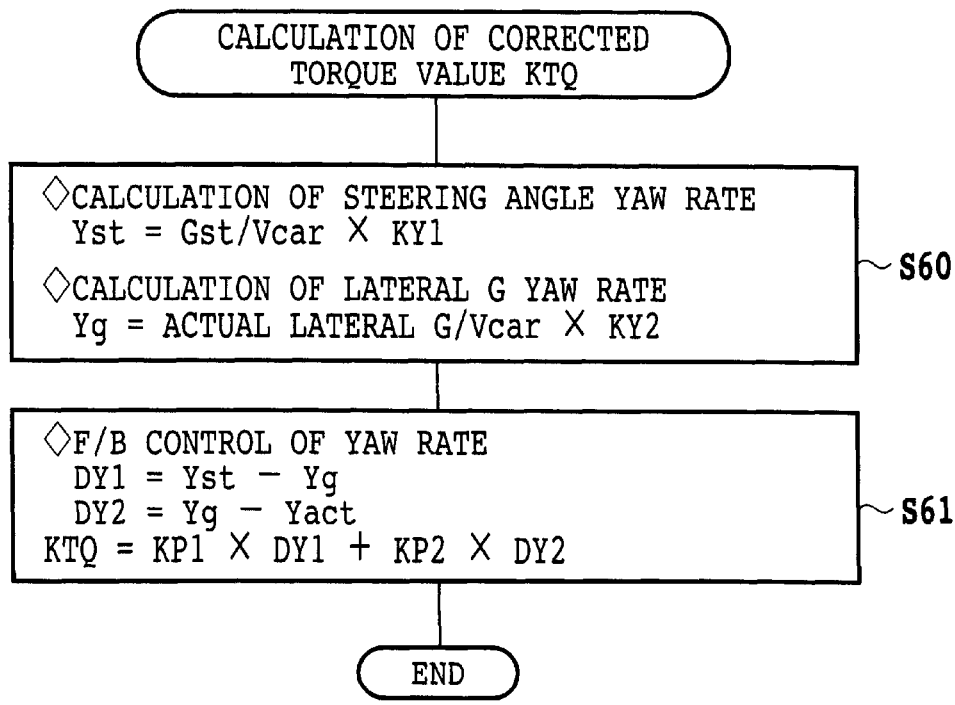
FIG. 25 is a flowchart showing a subroutine for calculation of a corrected torque value KTQ.

Referring again to FIG. 7, a corrected torque value KTQ is calculated in step S19 after calculation of the lateral distribution coefficient KLR in step S18. A calculation method for the corrected torque value KTQ is shown in the subroutine of FIG. 25. In step S60 in FIG. 25, a steering angle yaw rate Yst is calculated from Yst=Gst/Vcar×KY1, and a lateral G yaw rate Yg is further calculated from Yg=(actual lateral G)/Vcar×KY2. KY1 and KY2 are adjustment coefficients for uniforming the units of Yst and Yg to the unit of an actual yaw rate Yact.

In step S61, the yaw rate is feedback controlled to obtain the corrected torque value KTQ. First, DY1 and DY2 are calculated from DY1=Yst−Yg and DY2=Yg−Yact. Then, the corrected torque value KTQ is calculated from KTQ= KP1×DY1+KP2×DY2 where KP1 and KP2 are the gain coefficients of the P term in PID control. Since this feedback control is merely required to follow changes in the steering angle yaw rate and the lateral G yaw rate, only the P term in PID control is used. In the case that the G sensor 64 is not used, DY1=0 in step S61 because Yst=Yg. In this case, therefore, KTQ=KP2×DY2.

Referring again to FIG. 7, step S20 is next executed to obtain a right-wheel torque TrqR and a left-wheel torque TrqL after calculation of the corrected torque value KTQ in step S19. More specifically, the following calculation is made to obtain TrqR and TrqL.

$$TrqR=CarTrq\_MOT \times (0.5+KLR)+KTQ/2$$

$$TrqL=CarTrq\_MOT \times (0.5-KLR)-KTQ/2$$

To avoid the inversion of signs of the right and left drive forces, the following limit processing is executed.

If *CarTrq_MOT*>0 and *TrqR*≦0, *TrqR*=0

If *CarTrq_MOT*>0 and *TrqL*≦0, *TrqL*=0

If *CarTrq_MOT*<0 and *TrqR*≧0, *TrqR*=0

If *CarTrq_MOT*<0 and *TrqL*≧0, *TrqL*=0

Figure 26:
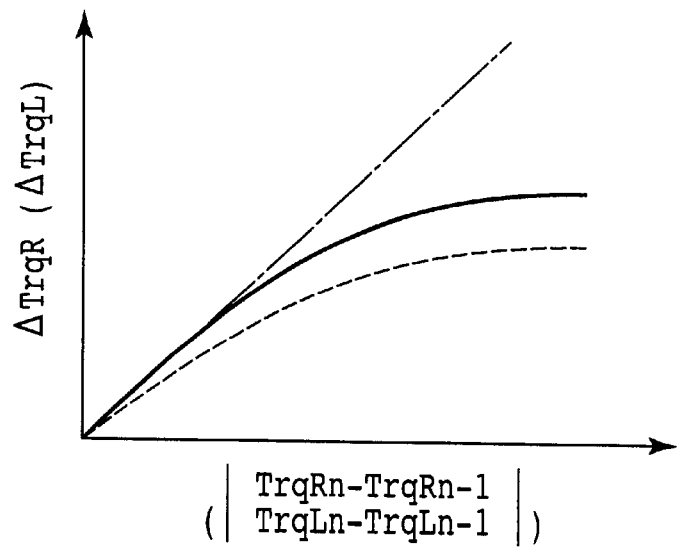
FIG. 26 is a table showing the relation between TrqRn−TrqR(n−1) and ΔTrqR.

In actual the table shown in FIG. 26 is referred to make the following calculation.

In the case of TrqR or TrqL>0, $$TrqRn=TrqR(n-1)+\Delta TrqR$$

$$TrqLn=TrqL(n-1)+\Delta TrqL$$

In the case of TrqR or TrqL≦0, $$TrqRn=TrqR(n-1)-\Delta TrqR$$

$$TrqLn=TrqL(n-1)-\Delta TrqL$$

In FIG. 26, the solid line corresponds to the drive torque, and the broken line corresponds to the regenerative torque.

Figure 27:
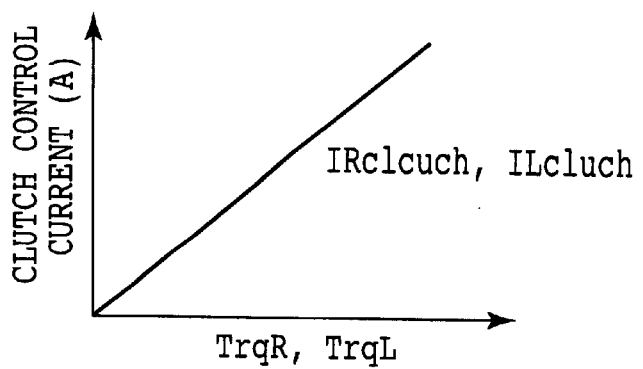
FIG. 27 is a table showing the relation between TrqR or TrqL and clutch control current.

Referring again to FIG. 7, step S21 is next executed to retrieve the table shown in FIG. 27 indicating the conversion between TrqR or TrqL and clutch control current, thereby deciding clutch control currents IRclutch and ILclutch. In step S22, the currents passing through the linear solenoid valves in the actuators 31 and 33 are controlled according to the clutch control currents obtained in step S21, thereby controlling the engaging forces of the clutches 30 and 32.

In the case of using the electromagnetic clutches 68 and 70 shown in FIGS. 5 and 6, current values in the electromagnetic clutches 68 and 70 are controlled to thereby control the engaging forces of the clutches 30 and 32. Accordingly, the drive force of the motor 14 to be distributed to the left and right rear wheels 10 and 12 can be properly controlled to thereby stabilize the vehicle behavior such as prevention of lateral slip during turning of the vehicle. Further, during deceleration of the vehicle, the running energy can be regenerated and converted into electrical energy by the motor, and the regenerated energy can be used for driving of the vehicle, thereby improving fuel consumption.

Figure 28:
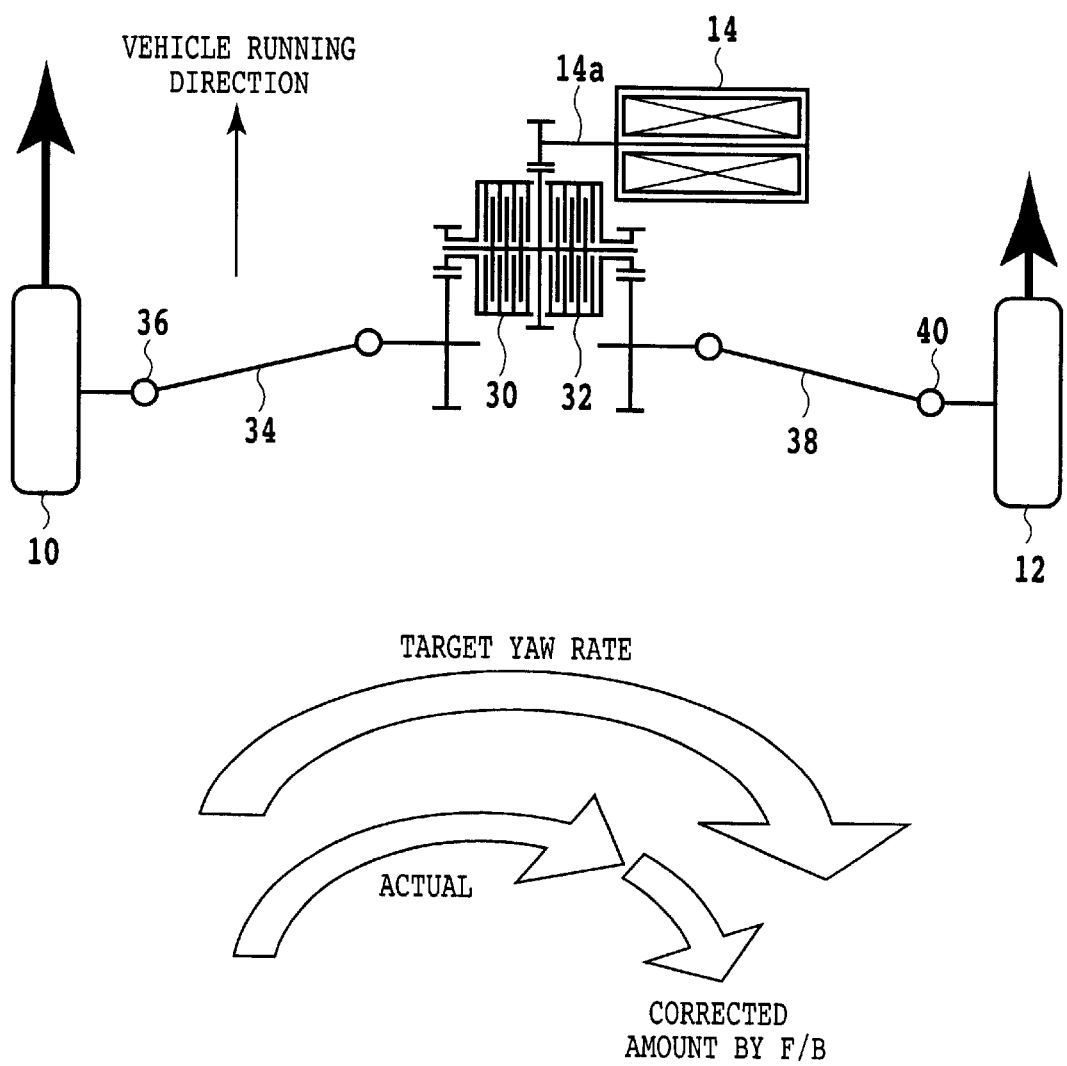
FIG. 28 is a schematic view for illustrating the operation of the present invention in the case of driving.
Figure 29:
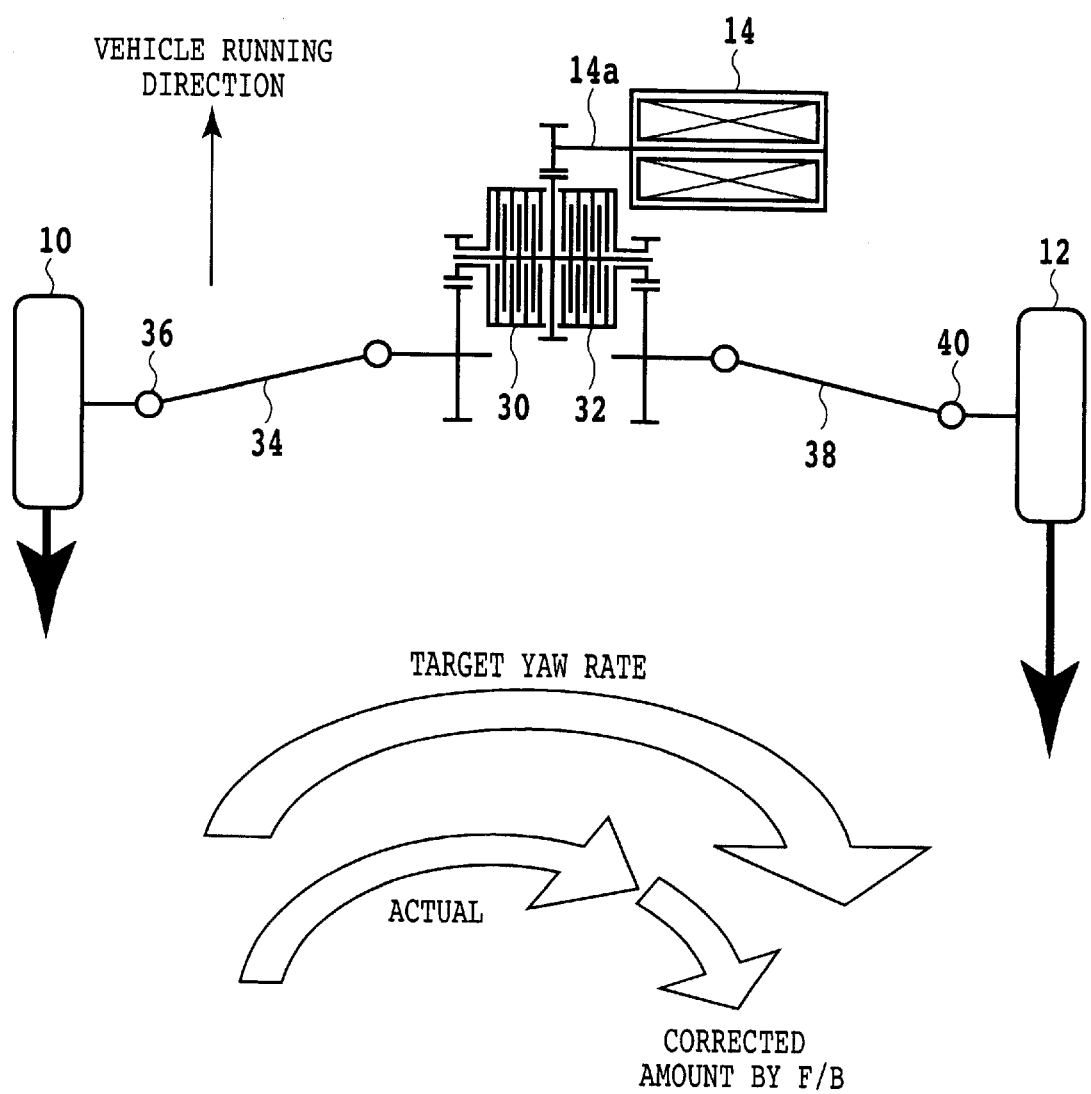
FIG. 29 is a schematic view for illustrating the operation of the present invention in the case of regeneration.

FIG. 28 shows the operation of the present invention in the case of driving, wherein the drive force of the left wheel 10 is increased to control the yaw rate so that it approaches the target yaw rate, thereby stabilizing the vehicle behavior. FIG. 29 shows the operation of the present invention in the case of regeneration, wherein the regenerative brake torque of the right wheel 12 is increased to control the yaw rate so that it approaches the target yaw rate, thereby stabilizing the vehicle behavior.

According to the present invention as described above, the distribution of drive forces to the right and left drive wheels connected to the motor can be properly controlled according to the vehicle speed, steering angle, and yaw rate, thereby stabilizing the vehicle behavior such as prevention of lateral slip during turning of the vehicle. Further, the running energy during deceleration of the vehicle can be regenerated and converted into electrical energy by the motor, and this electrical energy can be stored into the battery, thereby improving fuel consumption.

What is claimed is:

1. A drive force distribution apparatus for a hybrid vehicle having an engine for driving a pair of first drive wheels and an electric motor for driving a pair of second drive wheels, comprising:

a first clutch interposed between said electric motor and one of said second drive wheels;

a second clutch interposed between said electric motor and the other of said second drive wheels;

a battery for supplying electric energy to said electric motor and storing electric energy regenerated by said electric motor;

a vehicle speed sensor for detecting a vehicle speed;

an accelerator opening sensor for detecting an accelerator opening;

a brake depression force sensor for detecting a brake depression force;

a steering angle sensor for detecting a steering angle of a steering wheel;

a yaw rate sensor for detecting a yaw rate;

first means for deciding the distribution between a drive force for driving said first drive wheels and a drive force for driving said second drive wheels according to said vehicle speed detected, said accelerator opening detected, said brake depression force detected, a state of said battery, and a weight distribution of said vehicle;

second means for deciding the distribution between a drive force for driving one of said second drive wheels and a drive force for driving the other of said second drive wheels according to said vehicle speed detected, said steering angle detected, and said yaw rate detected; and clutch control means for controlling a degree of engagement of each of said first and second clutches according to the distribution decided by said second means.

2. A drive force distribution apparatus according to claim 1, wherein said second means comprises:

means for deciding a calculated lateral G from said vehicle speed and said steering angle;

means for deciding a lateral distribution coefficient KLR from said calculated lateral G and said vehicle speed;

means for calculating a steering angle yaw rate and a lateral G yaw rate;

means for calculating a corrected torque value KTQ according to said steering angle yaw rate calculated and said lateral G yaw rate calculated; and means for calculating the drive forces for driving said second drive wheels according to said lateral distribution coefficient KLR and said corrected torque value KTQ.

3. A drive force distribution apparatus according to claim 2, wherein when the sign of said drive force calculated on one of said second drive wheels is different from the sign of said drive force calculated on the other of said second drive wheels, either of said drive forces is set to 0.

4. A drive force distribution apparatus according to claim 1, further comprising:

a G sensor for detecting a lateral G;

said second means deciding the distribution between said drive forces for driving said second drive wheels according to said vehicle speed detected, said steering angle detected, said yaw rate detected, and said lateral G detected.

* * * * *